UNITED STATES PATENT OFFICE.

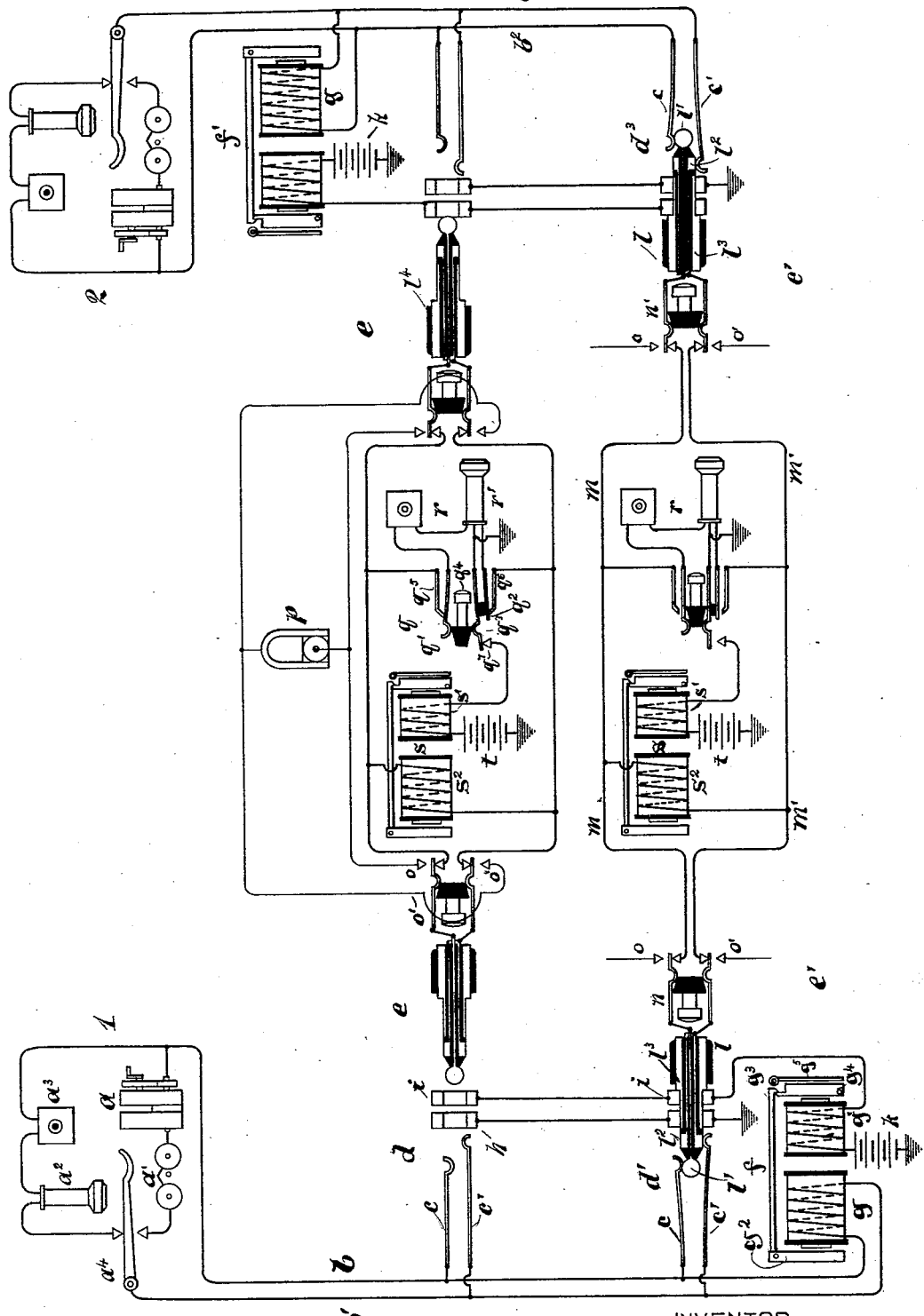

ORO A. BELL, OF BROOKLYN, NEW YORK, ASSIGNOR TO THE WESTERN ELECTRIC COMPANY, OF CHICAGO, ILLINOIS.

MULTIPLE-SWITCHBOARD SYSTEM FOR TELEPHONE-EXCHANGES.

SPECIFICATION forming part of Letters Patent No. 563,250, dated July 7, 1896.

Application filed May 19, 1892. Renewed October 3, 1894. Serial No. 524,841. (No model.) Patented in England March 5, 1892, No. 4,428.

*To all whom it may concern:*

Be it known that I, ORO A. BELL, a citizen of the United States, residing at Brooklyn, in the county of Kings and State of New York, have invented a certain new and useful Improvement in Multiple-Switchboard Systems for Telephone-Exchanges, (Case No. 5,) of which the following is a full, clear, concise, and exact description, reference being had to the accompanying drawing, forming a part of this specification, and for which Letters Patent have been granted in Great Britain, No. 4,428, dated March 5, 1892.

My invention relates to multiple-switchboard systems for telephone-exchanges. Its several objects are, first, to provide circuits and mechanism whereby the individual annunciator of a line shall be automatically reset or replaced by the operation of making a connection to the line, and whereby it shall be rendered unresponsive to signaling-currents during said connection; second, to provide an annunciator to respond to the signal for disconnection, and means for automatically resetting the same; third, to provide suitable means for testing at any board to determine whether a line is already in use or not; and fourth, to avoid all connections and branches common to the different lines of the exchange.

My invention may be generally described as consisting, first, in an annunciator having two magnets or helices, one adapted to operate an indicator when energized, and the other adapted to reset or restore said indicator to its normal position when energized and to retain it in said position during its energization, circuit connections including the first-mentioned helix in the line-circuit or in a branch therefrom, and other circuits including the second helix with a source of electricity in a normally open circuit adapted to be closed by the act of making connection to the line; second, in a similar two-coil annunciator having its operating helix included in circuit with the connecting-cords used for establishing connections between different lines, and its restoring-coil in a local circuit including a source of electricity and normally open at contact-points adapted to be closed by the operation of connecting the operator's telephone to the cord-circuit; third, in the arrangements of parts and circuit connections whereby the operation of closing the local circuit of the annunciator of a line serves also to alter the electrical condition of the test-pieces of the jacks of that line, enabling an operator at another section of switch-board to determine whether the line is already in use or not.

My invention is capable of being variously modified as to details, but a form thereof which is well adapted to practical use may be constructed and arranged as follows: The spring-jacks may each consist of two line-springs of different lengths, a test-ring insulated therefrom, and a contact-piece between the line-springs and the test-ring, common to all the jacks. Said spring-jacks are distributed upon the different sections of switch-board, one spring-jack for each line upon each switchboard. An individual annunciator is provided for each line upon some one of the boards. This annunciator is constructed with two magnets, or electromagnetic helices, one of which is adapted to operate an indicator when it is energized, and the other of which is arranged to restore the indicator to its normal position and to retain it inoperative while its coil is energized. The former of these coils I designate the "operating-coil" of the annunciator, and the latter the "restoring-coil."

The substation apparatus may be of the usual character. Each substation is connected by suitable circuits, which may be either metallic or grounded, with its particular switches upon the different switchboards, and with its individual annunciator. The different sides of the line-circuit are connected to the different line-springs of the spring-jacks, similar line-springs being connected to the same side of line. A branch or bridge connection extends between the two sides of line, and includes the operating-coil of the individual annunciator of that line. The test-rings of each line are connected together and by a branch through the restoring-coil of the individual annunciator of that line and through a battery to earth. The common contact-pieces are connected together throughout the exchange and to earth.

I employ connecting-plugs each having three separate contact-pieces comprising a tip adapted to make contact with the shorter line-spring of the spring-jack, into which the plug may be inserted, a short sleeve adapted to make contact with the longer line-spring of the jack, and a longer metallic sleeve adapted to cross together the test-thimble and the extra or common contact-pieces of the jack. Thus a signaling-current sent from the substation will find circuit through the operating-coil of the individual annunciator of that line, but the insertion of a connecting-plug into a spring-jack of the line closes together the grounded extra contact-piece and the test-rings of that line, thereby closing the local circuit, including the battery, and the restoring-coil of the annunciator, whereby the indicator of the annunciator is restored to its normal position, and any subsequent signaling-current sent from the substation, as the clearing-out or disconnection signal, will fail to operate the individual annunciator of that line.

A suitable number of connecting-plugs are provided at each section of multiple switchboard, connected in pairs in the usual manner; that is, those contact-pieces of the two plugs which are adapted to engage with the two line-springs of the jack are connected together by conductors, like contact-pieces of the two plugs being joined. Calling-keys of well-known construction may be included in the conductors joining the two plugs, whereby both line-contacts of either plug may be disconnected from those of the other and connected to a suitable source of electric current to send calling-signals to a substation.

To respond to or to receive the clearing-out or disconnection signals, I provide a clearing-out annunciator of construction similar to that of the individual annunciators. The operating-coil is included in a bridge connection between the different cord-strands joining the two plugs. Upon the operator's listening-key, which is otherwise of ordinary construction, and adapted to connect the operator's telephone, set also in a bridge connection between the different cord-strands, I provide an additional contact-spring and a contact-point so disposed that they shall be closed together when the key is operated to connect the telephone set to the cord-circuit. These contact-pieces are included in a local circuit containing the restoring-coil of the clearing-out annunciator and a source of electricity. Thus by the operation of closing the telephone set to the cord-circuit the clearing-out annunciator is reset.

To enable the operator to test a line to determine whether it is already in use or not, I provide a connection to earth from the center of the coil of the operator's telephone-receiver in the usual manner. Upon applying the tip of one of her plugs to the test-ring of the line which she desires to test, if the line is not in use, she will perceive a click in the telephone due to a current from the battery in the local circuit of which the test-rings form one terminal through the tip of the plug and a portion of the telephone-coil to earth. If, however, the line be in use, the local circuit is closed directly to earth from the test-ring by the long sleeve of the plug by which the connection is established at some other jack of the line, and hence no difference of potential will exist between the test-rings and the earth and no current will flow through the telephone.

My invention is illustrated in the accompanying drawing, wherein I have shown two substations each connected by lines with two spring-jacks upon two sections of multiple switchboard and with an individual annunciator at one of the boards, connected together into a continuous circuit by a pair of plugs and cords, and also a pair of plugs and cords in the position for testing a spring-jack of one of the lines.

The substation apparatus at station 1, at the left of the drawing, is of the well-known character, and consists of a calling-generator $a$ and signaling-bell $a'$, in one branch from line $b$, and telephone-receiver $a^2$ and transmitter $a^3$ in another branch from the same line, and the gravity-switch $a^4$, connected to the other side $b'$ of the line, and adapted to connect the signaling apparatus and the telephone apparatus alternately into the line-circuit as the telephone-receiver is placed upon or removed from the switch-hook.

The lines $b\ b'$ are connected, respectively, to the line-springs $c\ c'$ of spring-jacks $d\ d'$ upon two sections of switchboard $e\ e'$. A self-restoring individual annunciator $f$ is provided at the board $e'$, having its operating-coil $g$ included in a bridge between the lines $b\ b'$. This annunciator consists, briefly, of the two coils $g\ g'$, the former of which is adapted to actuate an armature $g^2$, provided with a catch $g^3$, engaging with the upper end of the soft-iron disk $g^4$, which is pivoted below and to one side of its center of gravity, whereby it tends to fall outward. This soft-iron disk is arranged to act as armature to the restoring-coil $g'$. A light shield $g^5$ is suspended immediately before the disk $g^4$ and is pivoted at its upper edge. When the catch $g^3$ is raised, the armature $g^4$ is released, falling outward to a slight distance, and in its fall pushing the shield $g^5$ into a nearly horizontal position. When the coil $g'$ becomes energized, it attracts the armature $g^4$, restoring it to its normal position, that shown in the drawing, and thus allowing shield $g^3$ to assume its normal position concealing the face of the disk $g^4$ and the number which may be painted thereon.

The spring-jacks $d$ and $d'$ are provided with common contact-pieces $h$, connected to earth, as described, and with insulated test-rings $i$, connected together and by a branch conductor through the restoring-coil $g'$ of the annunciator $f$ and a battery $k$ to earth.

The connecting-plugs, as $l$, are constructed each with a tip $l'$, making contact with the shorter line-spring $c$ and short sleeve $l^2$, making contact with the longer line-spring, and a third sleeve $l^3$, crossing together the test-ring and the common piece $h$. The tips of the two plugs of the pair are joined by conductors $m\ m$ and the shorter sleeves $l^2$ by conductors $m'\ m'$. Ringing-keys $n\ n'$ are included in these conductors, each adapted to disconnect the contacts $l'\ l^2$ of one plug from the corresponding contact-pieces of the other plug and to connect them to wires $o\ o'$, which form the terminals of the calling-generator $p$.

A listening-key $q$ is provided, having three contact-springs $q'\ q^2\ q^3$, adapted to be forced outward by the depression of the plunger $q^4$ and contact-pieces $q^5$, $q^6$, and $q^7$, adapted to make contact with the three springs, respectively, when said plunger is depressed. Of these contact-pieces $q^5$ and $q^6$ are connected to the conductors $m$ and $m'$, respectively. The springs $q'$ and $q^2$ form the terminals of the operator's telephone-set $r$, which is thus connected in a bridge-wire between the cord-strands $m$ and $m'$ when the said plunger is depressed. The spring $q^3$ is connected directly to earth, while the contact $q^7$ forms one terminal of the branch extending through the restoring-coil $s'$ of the clearing-out annunciator $s$ and thence through a battery $t$ to earth. The operating-coil $s^2$ of the annunciator $s$ is connected in a bridge connection between the cord-strands $m$ and $m'$. A ground connection is attached to the center of the coil of receiver $r'$ in the well-known way for testing purposes.

I will now trace in detail the operation of the system shown in the diagram.

Suppose that subscriber at station 1 wishes to communicate with a subscriber at another station, as, for example, station 2. The switch $a^4$ being down, the subscriber at station 1 operates his generator $a$, thus sending calling-current over lines $b\ b'$ and through the operating-coil $g$ of his individual annunciator $f$. The annunciator is thereby operated and the attention of the operator is attracted to the calling-line. The operator then inserts a plug, as $l$, into the jack $d'$ of that line at her board $e'$, and depresses the plunger of her listening-key, whereby her telephone is connected in a loop-circuit with the lines $b\ b'$. As soon as the plug $l$ is inserted into the jack $d'$, the circuit of the battery $k$ is closed through the restoring-coil $g'$ of the annunciator $f$, through the test-ring $i$ and contact-piece $h$ of jack $d'$ to earth; and the coil $g'$ being thus energized attracts its armature $g^4$ and restores the annunciator to its original position. The operator having learned from subscriber at station 1 the number of the line with which he desires connection, proceeds to test that line by applying to the test-ring of the spring-jack of that line at her board the tip of the other connecting-plug of the pair, her telephone being still connected in the cord-circuit. The plug $l^4$ at the board $e$ is shown in the act of making such a test. In case the line tested is already in use, as the line to station 2 is in the drawing, the test-rings $i$ of that line are short-circuited to earth through the sleeve $l^3$ and contact-piece $h$ of the jack at which connection already exists and no effect will be produced in the telephone of the operator testing. If, however, the line were not in use, the test-rings $i$ of that line would be disconnected from earth, and hence a difference of potential would exist between them and the earth due to the electromotive force of the battery $k$, and a grounded test-plug applied to the test-ring would receive current which would cause a click in the telephone $r'$, included in circuit with it. Hence an operator testing her line and perceiving a click in her telephone at each application of the testing-plug to the test-ring of the line, will conclude that the line is not in use. We will assume that the operator at board $e'$ finds line to station 2 not in use. She then inserts the other plug $l$ of her pair into the jack $d^3$ of the lines to station 2 at her board, whereby the stations 1 and 2 are looped together in a continuous circuit, which may be traced as follows: from the telephone at station 1 by line $b$ to the line-spring $c$ of jack $d'$, thence through the tip of plug $l$, through the contacts of the ringing-keys $n$ and $n'$, to tip of plug $l$, to line-spring $c$ of jack $d^3$ of line 2, thence by line $b^2$ to station 2, returning over line $b^3$ to line-spring $c'$ of jack $d^3$, thence through sleeve $l^2$ of plug $l$, contacts of ringing-key $n'$, conductors $m'\ m'$, contacts of ringing-key $n$ to the sleeve $l^2$ of plug $l$, thence to line-spring $c'$ of jack $d'$, thence returning over line $b'$ to station 1. The operator at board $e'$ now depresses the plunger of her key $n'$, disconnecting the springs thereof from the conductors $m'\ m'$ and connecting them to the poles $o\ o'$ of the generator $p$, thereby sending a calling-current to station 2 and operating the signal-bell at that station. Having ascertained that the subscribers have engaged in conversation, the operator allows the plunger $d^4$ of her listening-key to rise, thereby disconnecting her telephone-set from the conductors $m\ m'$. When the subscribers have completed their conversation, one or both of them—we will consider only subscriber at station 1—may send a clearing-out or disconnection-signal. The signaling-current will divide at the line-springs $c\ c'$ of jack $d'$, a portion passing through the operating-coil $g$ of annunciator $f$. This annunciator will not be operated, however, since the restoring-coil $g'$ is energized and retains the armature $g^4$, preventing its movement. Another portion of the signaling-current will reach the conductors $m\ m'$, where it will again divide, a portion passing through the operating-coil $s^2$ of the clearing-out annunciator $s$. The local circuit containing restoring-coil $s'$ of this annunciator is open, the operator's telephone-set being disconnected, and hence its armature $g^4$ is unattracted and falls, indicating the disconnection-signal to the operator. Another portion of the current will escape through the conductors $m\ m'$ and a portion of the conductors $b^2\ b^3$ through the operating-coil $g$ of the annunciator $f$, but the local circuit of its restoring-magnet is also closed through the sleeve $l^3$ of the connecting-plug in the jack $d^3$, and hence this individual annunciator also will be unresponsive. In response to the clearing-out signal the operator at board $e'$ may again bring her telephone-set $r$ into connection with the cord-strands $m\ m'$ to assure herself that the conversation between the subscribers has been finished. The contact-pieces $q^3\ q^7$ upon the key $o$ are thus closed together, completing the local circuit through the restoring-coil $s'$ and restoring the clearing-out annunciator to its normal position. It is not, however, necessary that the operator should connect her telephone to the lines at this stage, since she must of necessity do so when she receives another call, and will therefore reset the clearing-out annunciator of that pair of cords. Having ascertained that the subscribers have completed their conversation, she removes the connecting-plugs from the spring-jacks.

The number of operations or movements which the operator is required to make in establishing and severing connection between the two subscribers and restoring the apparatus to its normal position is by my system materially reduced, the special annunciators being automatically restored to their normal positions by the act of connecting the subscribers. Moreover, since the operator is not required to reset the annunciators manually, they may be placed above the switchboard, and the space upon the face of the switchboard, which is ordinarily occupied by annunciators, may be utilized for spring-jacks, thereby increasing the capacity of the switchboard. It will be observed that when metallic circuits are employed in this system no connections common to the different lines are required. The restoring-circuits and the test-circuits are wholly local and are entirely disconnected and insulated from the line-circuits.

A modification of my invention which may be specially adapted to the conditions of some exchanges consists in such a disposition of the battery in the test or restoring circuit that the test-signal, the click in the operator's receiver, shall be given when the line is in use, no signal being given when an idle line is tested, as in the test system in ordinary use. In order to accomplish this, I place battery $k$ in circuit between the common contact-pieces $h$ and earth, and ground restoring-coils $g'$ of the individual annunciators directly. With this arrangement, the test-rings of the idle line will not be electrified; but when a connecting-plug is inserted in any spring-jack of the line the electrified contact-pieces $h$ are crossed with the test-ring, thereby electrifying the latter. Thus a grounded plug applied to the test-ring will receive current therefrom and the signal will be given in the operator's telephone.

I do not wish to limit myself to the employment of restoring annunciators only in my invention. I sometimes employ annunciators such as the following: The annunciator is simply provided with two coils or magnets arranged to act differentially upon an armature common to both, which armature is adapted to operate an indicator when actuated in a certain direction. The magnet or helix which tends to release or operate the indicator is termed the "operating-coil," and the other, which is adapted to counteract the influence of the operating-coil and to render the annunciator unresponsive when the operating-coil is energized, is termed the "retaining-coil." When this annunciator is employed in connection with my system, the operating-coil is included as in the present instance in the branch circuit between the two sides of the line, and the retaining-coil is placed in the local circuit instead of the restoring-coil of the self-restoring annunciator. In my system, thus modified, the advantages other than the self-restoring feature remain unimpaired.

Having thus described my invention, I claim as new, and desire to secure by Letters Patent—

1. The combination, in a spring-jack of two line-springs a test-ring in front of the presented ends of said line-springs and insulated from them, and an extra contact-piece insulated from both the said line-springs and the test-ring but adapted to be crossed with said test-ring by the insertion of the plug into the jack, substantially as specified.

2. The combination with a spring-jack having two line-contacts, a test-ring insulated from said line-contacts, and an extra contact-piece, of a connecting-plug inserted in the spring-jack having contact-pieces making connection with the different line-contacts thereof, and another contact-piece making connection between the test-ring and said extra contact-pieces of the jack, substantially as described.

3. The combination with a telephone-line, of spring-jacks each having two line-springs connected respectively to the different sides of the line, a test-ring and an extra contact-piece normally insulated from the test-ring, like contacts of all the spring-jacks being connected together, the extra contact-piece being grounded directly and the test-rings being grounded through a battery, of a connecting-plug adapted to be inserted into any one of said spring-jacks, provided with three contact-pieces two of which are adapted to make contact with the different line-springs respectively of the jack and the remaining contact-piece to cross together the test-ring and the extra contact-piece whereby the electrical condition of all the test-rings of the line is altered by the insertion of said connecting-plug into any spring-jack of the group, and means for testing the electrical condition of the test-rings, substantially as described.

4. The combination with a telephone-line, of spring-jacks at the central station each having four contact-pieces insulated from each other, like contact-pieces being connected together, two groups of contact-pieces being connected to the different sides of line-circuit respectively, an individual annunciator having two electromagnets, one of which is adapted to actuate a suitable indicator when excited, the other of which is adapted to prevent the operation of such indicator when excited, the first-mentioned of said magnets being included in the line-circuit or in a branch thereof, circuit connections including the remaining magnet of said indicator with a source of electricity in a local circuit of which the two remaining groups of contact-pieces form normally-separated terminals, and means for crossing together the said terminals of the local circuit when connection is made with the line, substantially as described.

5. The combination with two connecting-plugs and conductors joining the like contact-pieces of the two plugs, of an operator's telephone and a key adapted to connect the same with the conductor joining the plugs, a clearing-out annunciator having two electromagnets, one of which is adapted to actuate a suitable indicator when energized, and the other of which is adapted to restore the said indicator to its normal position, said first-mentioned magnet being connected with the circuit uniting the plugs, contact-pieces upon the key so disposed as to be closed together by the operation of connecting the operator's telephone in circuit with the plugs, and circuit connections including the restoring-coil of the annunciator with a source of electricity in a local circuit of which the contact-pieces upon the key form normally open terminals, substantially as described.

In witness whereof I hereunto subscribe my name this 25th day of February, A. D. 1892.

ORO A. BELL.

Witnesses:
C. H. STRONG,
J. O. PARSONS.